March 19, 1946.  R. E. BURRUS  2,396,985

CLUTCH MECHANISM

Filed March 10, 1945

INVENTOR.
Robert E. Burrus
BY Walter E. Schirmer
Attys

Patented Mar. 19, 1946

2,396,985

UNITED STATES PATENT OFFICE 2,396,985

CLUTCH MECHANISM

Robert E. Burrus, Buchanan, Mich., assignor to Clark Equipment Company, Buchanan, Mich., a corporation of Michigan Application March 10, 1945, Serial No. 582,027

6 Claims. (Cl. 192—41)

This invention relates to a clutch mechanism, and more particularly is concerned with an improved method for actuating a clutch of the helically coiled spring type used in coupling two rotating parts together under predetermined speed conditions.

The invention is particularly concerned with incorporation of such a clutch mechanism in the driving connection between a booster engine and a primary engine in an automotive vehicle such as the connection shown in the copending application of Donald D. Ormsby, Serial No. 508,014, filed October 28, 1943, although it is to be understood that the present clutching mechanism can be used in other fields and is not to be specifically limited to this particular application.

One of the primary objects of the present invention is to provide a clutch mechanism wherein there is incorporated a cam actuated sleeve for actuating the end of the helically coiled spring to expand the same into clutching engagement when the speed of rotation of one of the rotating parts tends to overrun the speed of rotation of the other part.

Another feature of the present invention is to provide a mechanism of this type which is simple in operation and yet is positive and eliminates the necessity for using a tickler spring or the like for clutch actuation.

Other objects and advantages of the present invention will appear more fully from the following detail description which, taken in conjunction with the accompanying drawing, will disclose to those skilled in the art the particular construction and operation of a preferred form of the present invention.

Figure 1:
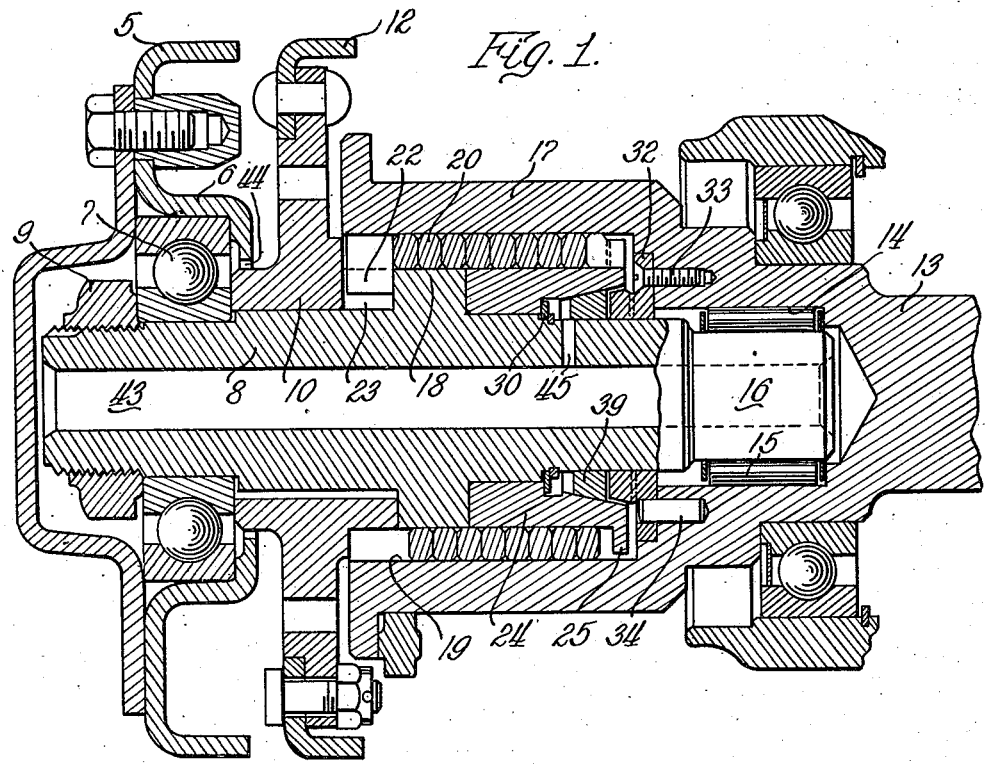
Figure 1 is a sectional view through a clutch mechanism embodying the present invention.

Referring now in detail to the drawing, there is provided a construction in which a fluid coupling or the like acts to drive one element of the clutch mechanism, the other element of which is connected for rotation to a transmission or similar power transmitting mechanism.

The impeller of the fluid driving mechanism is indicated generally at 5 and includes a hub portion 6 within which is disposed the ball bearing assembly 7 for mounting the inner end of the spindle shaft 8, which shaft is provided with a reduced threaded end receiving the lock nut 9 for locking the ball bearing assembly in position against the hub portion 10 of the rotor element 12 of the fluid coupling. The impeller member 5 is connected for driving engagement to a suitable power source such as the crank shaft of the booster or auxiliary engine and through the coupling elements (not shown) effects a fluid drive to the rotor element 12 which in turn drives the hub portion 10 splined on shaft 8.

The output shaft of the clutch mechanism indicated at 13 is provided with an enlarged counterbored end 14 in which is disposed the needle bearing assembly 15 receiving the opposite end 16 of the shaft 8. The end portion of shaft 13 is then further enlarged to provide the cylindrical flange portion 17 overlying and radially spaced from the shoulder 18 formed on the spindle 8. Interposed between the annular surface of the shoulder 18 and the internal annular surface 19 of the extension 17 is a helically coiled spring member 20 which has one end thereof turned radially inwardly as indicated at 22 to engage a suitable slot or recess 23 formed in the hub 10 of the driven member of the fluid flywheel whereby the spring member is caused to rotate with the fluid flywheel and in turn is maintained in contracted position so that it does not engage the internal annular surface 19 of the extension 17.

Figure 2:
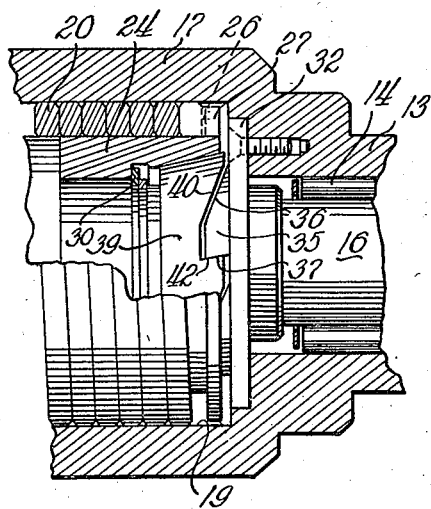
Figure 2 is an enlarged detail view, partly in section, of the mechanism shown in Figure 1.
Figure 3:
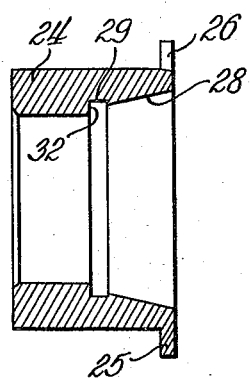
Figure 3 is a detail sectional view of the actuating sleeve for the clutch mechanism shown in Figure 1.

Mounted on the spindle 8 on the opposite side of the shoulder 18 is a sleeve member 24, shown more in detail in Figure 3, provided at one end with the radially extending flange 25 which is notched or slotted as at 26 to receive the opposite end of the spring member 20, this end being machined or bent to fit into the slot as shown in Figure 2 at 27. Radially inwardly of the flange 25 the member 24 is provided with the tapered surface 28 which tapers radially inwardly toward the annular groove 29. The groove 29 is adapted to receive the lock ring 30 shown in Figures 1 and 2 which bears against the shoulder 32 of the sleeve 24 to hold the sleeve against axial movement on the spindle 8.

Thus, it will be seen that under normal operation the spring 20 and the sleeve 24 rotate conjointly with the driven element 12 of the fluid coupling, and the spring remains in retracted position.

Mounted about the spindle 8 and secured in a suitable recess in the radial end wall of the shaft 13 defining the inner end of the annular surface 19 is a plate member 32 which is secured in the radial wall of the shaft 13 as by means of screws 33 and is suitably locked in position as by means of dowels 34. The plate member 32 carries a series of circumferentially arranged cam projections 35 which have tapered cam surfaces 36 and oppositely cut-in shoulder portions 37, all as shown in Figure 2. It will therefore be apparent that these cam projections 35 together with the plate 32 rotate conjointly with shaft 13, the cam portions 35 of the member being disposed within the tapered end 28 of sleeve member 24.

Also mounted on spindle 8 immediately adjacent the cam projections 35 is a cam ring 39, which ring as shown in Figure 2 is provided with corresponding cam surfaces 40 and oppositely angled surfaces 42 cooperating respectively with the cam surfaces 36 and 37 of the cam projections 35 of plate 32. The sleeve member 39 is free to rotate on the spindle 8, and suitable lubricant is introduced thereinto through the passageway 43 formed in the spindle and receiving lubricant from the fluid coupling through the opening 44 and discharging lubricant through radial port 45 into the space defined by the tapered surface 28 of the sleeve 24. A portion of this lubricant is also passed through the bore 43 to lubricate the bearings 15.

In the operation of this clutch actuating mechanism composed of cam projections 35 and the sleeve 39, it will be apparent that as the shaft 13 tends to overrun the rotor member 12 of the fluid coupling, the surfaces 37 of the projections 35 bear against the surfaces 42 of the sleeve 39, holding the sleeve in its outward position or away from the stop ring 30, thereby relieving the frictional engagement between the tapered surface of sleeve 39 and the internal tapered surface 28 of sleeve 24. As a result, there is no drag imposed on sleeve 24 and the spring 20 remains in contracted position.

However, as the driven member 12 of the fluid coupling increases in speed, it increases the speed of rotation of sleeve 24, and when this sleeve reaches a speed exceeding that of shaft 13, the sleeve 39 is caused to rotate forwardly relative to the cam projections 35, thereby causing the cam surfaces 40 to move against the cam surfaces 36, forcing the sleeve axially inwardly toward the small end of the tapered surface 28. This results in a frictional engagement of the sleeve 39 on the sleeve 24, tending to retard the rotation of sleeve 24 relative to rotation of spring 20. Through engagement of the end 27, the spring 20 is thus caused to expand which in turn forces it against the inner annular surface 19 of the extension 17 of shaft 13, producing a clutching or gripping action which positively clutches the driven element 12 to the extension 17 to provide a non-slipping drive therebetween, whereby the torque from the fluid coupling is transmitted directly to the shaft 13 through the spring 20 to provide a positive drive therebetween.

As the speed of shaft 13 again tends to exceed that of the drive element 12, the tapered sleeve 39 begins to move slower than the plate member 32, causing cam surfaces 37 and 42 to engage which, due to their reverse angularity, tends to draw the sleeve 39 toward the plate 32 relieving the frictional drag on the sleeve 24 and thereby allowing the spring to contract to disengage the clutching action between the spring 20 and the extension 17 of shaft 13, thereby declutching the fluid coupling from the shaft 13.

It is apparent that the present construction therefore provides a positive coupling through the spring whenever the speed of the driven element of the fluid coupling tends to exceed that of the shaft 13, and provides for automatic release of this clutching engagement when the shaft 13 again tends to overrun the element 12. Thus, an automatic clutching action providing a one-way clutching drive from the fluid coupling to shaft 13 is provided.

I am aware that this particular type of clutch engagement may be employed in other situations than for coupling a booster engine to a lay shaft, and I therefore do not intend to be limited to its use only in the illustrated form. Consequently, the invention is not to be limited except as defined by the scope and spirit of the appended claims.

I claim:

1. A one way clutch mechanism including a pair of shafts having telescoping portions, a helically coiled spring therebetween anchored at one end to one of said shafts, a sleeve having means engaged by the other end of said spring and having an internal tapered surface, a rotatable cam sleeve disposed about said one shaft and within said surface and having a corresponding tapered surface, and cam means carried by said other shaft for causing said cam sleeve to move into frictional engagement with said first mentioned sleeve to retard the same and cause expansion of said spring into clutching engagement between said shafts when said one shaft tends to overrun said other shaft.

2. The mechanism of claim 1 including coacting cam surfaces between said cam sleeve and cam means for retracting said cam sleeve out of frictional engagement when said other shaft tends to overrun said one shaft.

3. Actuating mechanism for a helically coiled spring adapted to clutch two shafts together including a sleeve having an internal tapered surface, one end of said spring being secured to said sleeve and the other end to one of said shafts, a cam sleeve within said tapered surface of said first-mentioned sleeve, and cam means carried by said other shaft for actuating said cam sleeve axially to energize or deenergize said spring, depending upon the relative speed of said shafts.

4. The actuating mechanism of claim 3 including an external tapered surface on said cam sleeve for frictionally engaging and retarding rotation of said first mentioned sleeve to expand said spring when said one shaft tends to overrun said other shaft.

5. The actuating mechanism of claim 3 wherein said cam sleeve and said cam means have interengaging cam surfaces operable in one direction of relative rotation between said shafts to shift said cam sleeve axially into frictional engagement with said tapered surface for expanding said spring into clutching engagement and operable in the opposite direction of relative rotation to retract said cam sleeve out of frictional engagement with said tapered surface to allow contraction of said spring out of clutching engagement.

6. In combination, a shaft having an annular surface, a helically coiled spring about said surface having one end anchored to said shaft, said shaft having a reduced portion, a rotatable sleeve on said reduced portion having an internal tapered surface, the opposite end of said spring being anchored to said sleeve, a second shaft having an enlarged portion overlying said spring, a cam plate on said second shaft having axially extended cam projections adjacent the large end of said tapered surface, a loose cam sleeve journalled on said reduced portion of said first shaft and having a tapered external surface within the tapered surface of said first sleeve, and coacting cam surfaces on said cam sleeve engaged by said cam projections for axially shifting of said cam sleeve in opposite directions to energize or deenergize said spring, depending upon the relative speeds of said shafts.

ROBERT E. BURRUS.